United States Patent
Jahn et al.

[11] Patent Number: 5,823,457
[45] Date of Patent: Oct. 20, 1998

[54] SAFETY BELT REELING DEVICE WITH COMFORT FUNCTION

[75] Inventors: Walter Jahn, Ehningen; Lars Axelsson, Elmshorn; Frank Fugel, Halstenbek, all of Germany

[73] Assignees: Autoliv Development AB, Vargarda, Sweden; Mercedes-Benz AG, Stuttgart, Germany

[21] Appl. No.: 823,935

[22] Filed: Mar. 25, 1997

[51] Int. Cl.⁶ .................................................. B60R 22/44
[52] U.S. Cl. ........................................ 242/372; 242/375
[58] Field of Search .................... 242/375, 375.1, 242/375.2, 375.3, 372; 280/807

[56] References Cited

U.S. PATENT DOCUMENTS

| | | | |
|---|---|---|---|
| 2,532,828 | 12/1950 | Westfall | 242/375 |
| 4,162,772 | 7/1979 | Shimogawa et al. | 242/372 |
| 5,310,132 | 5/1994 | Kopetzky | 242/372 |
| 5,478,024 | 12/1995 | Ray | 242/372 |
| 5,535,959 | 7/1996 | Hamann et al. | 242/372 |

FOREIGN PATENT DOCUMENTS

| | | |
|---|---|---|
| 2923691 | 12/1979 | Germany . |
| 4315886 | 11/1994 | Germany . |

*Primary Examiner*—John M. Jillions
*Attorney, Agent, or Firm*—Robert W. Becker & Associates

[57] ABSTRACT

A safety belt reeling device with comfort function has a housing and a reeling shaft rotatably supported in the housing. A pawl wheel is fastened to the reeling shaft and switchable between a locked position in which rotation of the pawl wheel is blocked and a release position in which the pawl wheel is rotatable. A winding spring, connected with a first end to the housing and with a second end to the pawl wheel, is provided for rotating the reeling shaft when the pawl wheel is in the release position. A comfort spring with a weaker spring force than the winding spring is provided. The comfort spring is connected with a first end to the pawl wheel and with a second end to the reeling shaft. The pawl wheel has a stay with a first and a second end. The first end of the comfort spring is guided in a single loop about the first end of the stay. An elastically deformable dampening element is positioned between the first end of the stay and the single loop. The dampening element reduces the load impact on the comfort spring, when the pawl wheel is switched into the release position, by allowing a displacement of the single loop relative to the stay.

5 Claims, 2 Drawing Sheets

SAFETY BELT REELING DEVICE WITH COMFORT FUNCTION

BACKGROUND OF THE INVENTION

The present invention relates to a safety belt reeling device with comfort function comprising a winding spring positioned between a housing part and the belt reeling shaft and a rotatably supported pawl wheel positioned between the winding spring and the reeling shaft and controlled by a control device for positioning in a release position and a locked position. One end of the winding spring is connected to the pawl wheel. The device further comprises a comfort spring that is of a weaker spring force than the winding spring, is serially switched with the winding spring, and is acting between the pawl wheel and the reeling shaft. One end of the comfort spring is connected to the reeling shaft and the other end of the comfort spring is connected to the pawl wheel. One end of the comfort spring is guided in a single layer about a stay of the pawl wheel. The safety belt reeling device is provided with a device for reducing the load impact acting on the comfort spring when the winding spring is activated.

A safety belt reeling device of the aforementioned kind is disclosed in German patent 43 15 886. In such a safety belt reeling device, only the weaker comfort spring is active for providing the comfort function when the safety belt is in use and is pulled out of or retracted into the safety belt reeling device due to the movement of the passenger buckled in the seat. This is so because the pawl wheel is locked by the control device. When the safety belt is unbuckled, the locking of the pawl wheel is released so that the winding spring coupled to the pawl wheel is now activated and rotates the reeling shaft via the serially connected comfort spring in the winding direction. At the beginning of the winding movement, the winding spring acts first onto the comfort spring and tensions it until the tensioned comfort spring under the continuing action of the winding spring will rotate the reeling shaft. During this process, at the end of the tensioning travel of the comfort spring, an abrupt loading of the suspension (connection) of the corresponding spring end of the comfort spring at the pawl wheel occurs. For reducing such load impact, it is known from German patent 43 15 886 to arrange a leaf spring extending over a number of windings together with the comfort spring whereby the fixed end of this leaf spring together with the corresponding end of the comfort spring is rolled up so that both spring ends together are secured at the stay of the pawl wheel.

The aforementioned device has the disadvantage that the additional brake spring to be placed between the spring windings of the comfort spring results in a cumbersome mounting of the safety belt reeling device whereby the common suspension (connection) of the spring ends to be combined is complicated and undesirable.

It is therefore an object of the present invention to provide a safety belt reeling device of the aforementioned kind in which the suspension of the comfort spring at the pawl wheel is simplified while a reliable action for a high number of movement cycles is maintained without reducing the effect of impact compensation when the winding spring is switched on.

SUMMARY OF THE INVENTION

The safety belt reeling device with comfort function according to the present invention is primarily characterized by:

A housing;
A reeling shaft rotatably supported in the housing;
A pawl wheel fastened to the reeling shaft and switchable between a locked position in which rotation of the pawl wheel is blocked and a release position in which the pawl wheel is rotatable;
A winding spring, connected with a first end to the housing and with a second end to the pawl wheel, for rotating the reeling shaft when the pawl wheel is in the release position;
A comfort spring having a weaker spring force than the winding spring;
The comfort spring connected with a first end to the pawl wheel and with a second end to the reeling shaft and serially switched with said winding spring;
The pawl wheel having a stay with the first and a second end;
The first end of the comfort spring guided in a single loop about the first end of the stay;
An elastically deformable dampening element positioned between the first end of the stay and the single loop;
The dampening element reducing the load impact on the comfort spring, when the pawl wheel is switched into the release position, by allowing a displacement of the single loop relative to the stay.

Preferably, the single loop has a free end extending from the point of directional reversal of the single loop toward an outer spring winding of the comfort spring.

The dampening element preferably has a zone of material weakening positioned between the point of directional reversal of the single loop and the stay.

The stay has a channel and the free end of the single loop is guided in the channel.

The dampening element preferably is simply slipped onto the stay.

Accordingly, the basic concept of the invention is that in the abutment area between the stay of the pawl wheel and the single loop of the comfort spring guided about the stay, an elastically deformable dampening element is arranged that allows a displacement of the single loop relative to the stay.

The invention is advantageous because the acceleration forces, occurring at the end of the tensioning process of the comfort spring before the beginning rotation of the reeling shaft and acting via the support of the comfort spring at the pawl wheel onto the end of the comfort spring connected thereto, are compensated by the elastically deformable dampening element because the single loop of the comfort spring end is displaceable by an amount determined by the dampening element relative to its normal fastening position at the pawl wheel so that a compensation of the impact-like loading results. The respective suspension of the spring end at the pawl wheel is easily realized because the stay of the pawl wheel must only be additionally provided with a dampening element about which the spring end of the comfort spring is guided in a single loop. Thus, a special embodiment of the stay or of the end of the comfort spring is not required.

According to another embodiment of the invention, the spring end of the comfort spring guided about the stay in a single loop has a free end which projects from the point of directional reversal of the single loop in the direction toward the spring windings of the comfort spring so that the displacement of the spring end relative to the stay of the pawl wheel is not obstructed. According to a further embodiment of the invention, it may also be provided that the free end of the single loop is guided in a channel provided within the stay of the pawl wheel. This channel thus determines the displacement travel for the spring end.

Furthermore, it is suggested to provide the dampening element with a zone of material weakening (weakness) in a location between the point of reversal of the single loop and the stay provided at the pawl wheel, for example, in the form of a hole penetrating the dampening element in order to thus improve the elasticity of the dampening element by providing a cross-sectional material reduction.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENT

The present invention will now be described in detail with the aid of a specific embodiment utilizing FIGS. 1 and 2.

Figure 1:
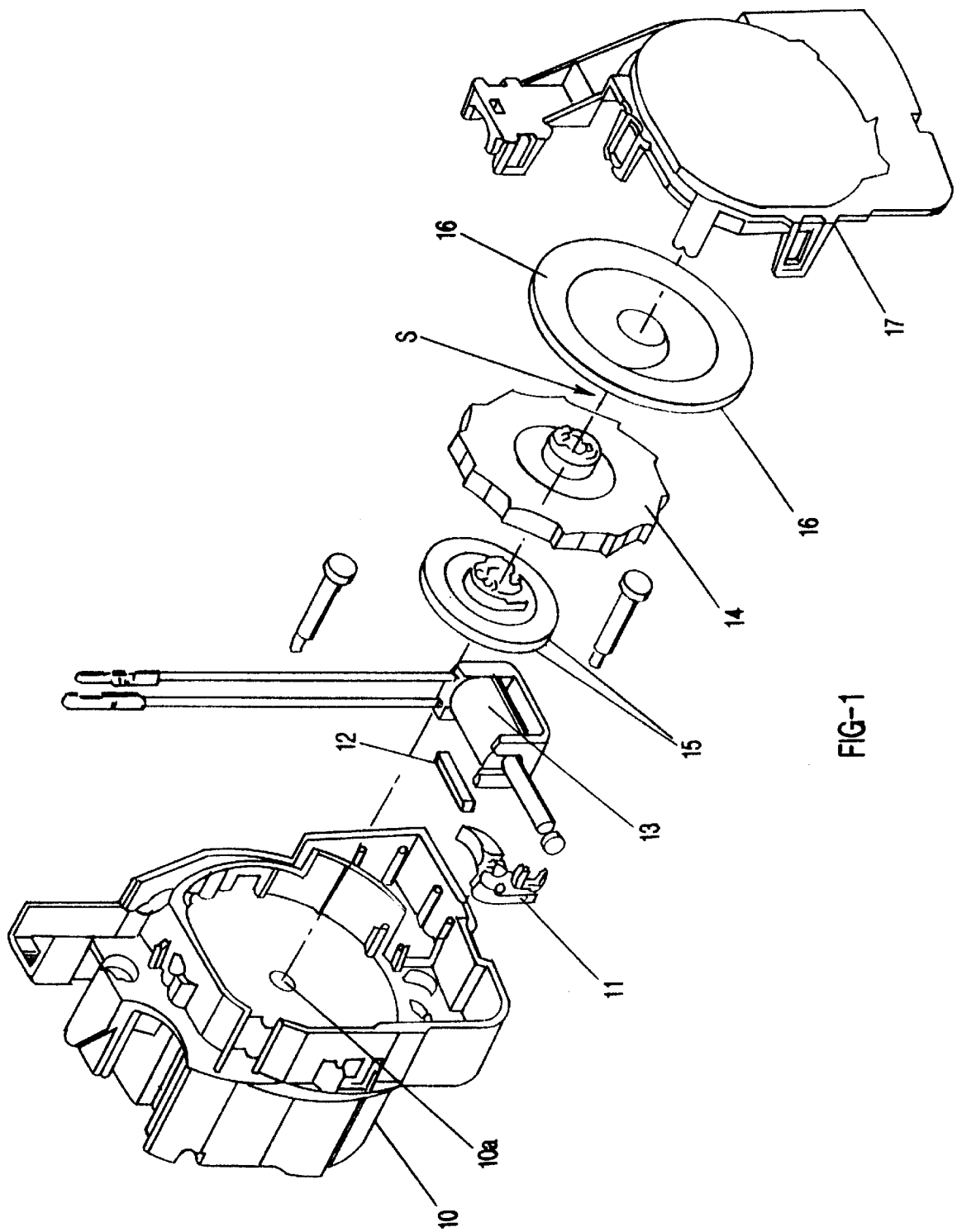
FIG. 1 shows the spring side of a safety belt reeling device in an exploded view.
Figure 2:
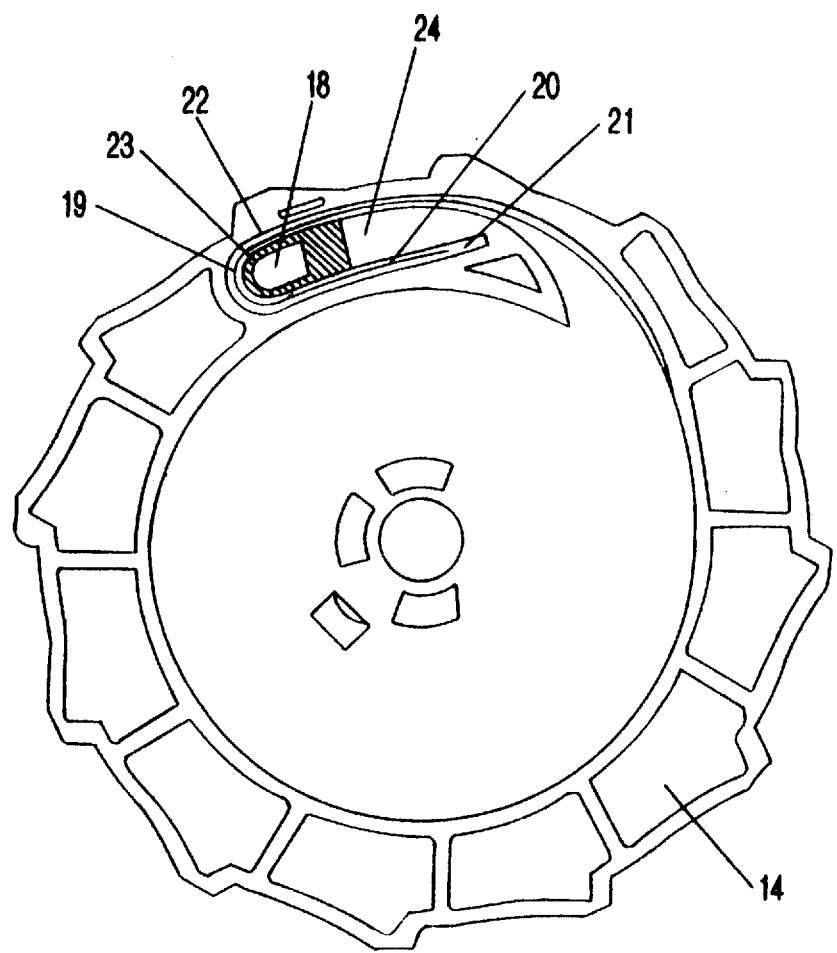
FIG. 2 shows the pawl wheel and the suspension of the comfort spring thereat in a detailed in a plan view.

FIG. 1 shows only the lateral cover 10 of the safety belt reeling device at the spring side of the housing whereby the reeling shaft S is represented only schematically by the line extending centrally through the components representing its bearing projection extending through the cutout 10a of the cover 10. A control pawl 11 is supported at the housing cover 10 and is acted on by a tension spring 12 that is actuated by a solenoid 13. On the bearing projection S of the reeling shaft S, a pawl wheel 14 is arranged which by engagement of the control pawl 11 can be switched into a locked position or, when released by the control pawl 11, can be in a release position. A comfort spring 15 is arranged at the side of the toothed pawl wheel 14 facing the housing cover 10 which with its inner end is connected to the reeling shaft S while the other end of the comfort spring 15 is secured in a manner which will be disclosed in the following to the pawl wheel 14.

At the side of the pawl wheel 14 facing away from the cover 10, a winding spring 16 is arranged. Its inner end is connected to the pawl wheel 14 and its outer end is connected to a housing cover 17.

As can be seen in detail in FIG. 2, the suspension or connection of the comfort spring 15 at the pawl wheel 14 is as follows. The pawl wheel 14 has a stay 24 which projects into the plane of the comfort spring 15 whereby the outer spring end 19 of the comfort spring 15 is guided in a single loop with a loop angle of approximately 180° about this stay 24. The free end 20 of the spring end 19 projects after being guided about the stay 24 in a direction toward the preceding outer spring winding whereby the free end 20 is guided in a channel 21 provided at the pawl wheel 14. Between the stay 24 and the single loop end 19 an elastically deformable dampening element 22 of a suitable material is positioned which has an abutment area 23 providing the guiding portion between the spring end 19 and the stay. The dampening element 22 comprises an area of material weakness in the form of a hole 18. Due to the thus resulting cross-sectional material reduction, the elasticity of the dampening element 22 is improved. As can be seen further in FIG. 2, the channel 21 has a greater length than the free end 20 of the spring end 19 in its rest position in order to provide the required displacement travel for the free end 20 of the spring end 19 relative to the stay 24 for compensating impact loads.

During winding of the safety belt reeling device, initiated by the control pawl 11 controlled by the solenoid 13 releasing the pawl wheel 14 into the respective rotational position (release position), the rotation of the pawl wheel 14 causes tensioning of the comfort spring 15. When tensioning of the comfort spring 15 is complete, an impact loading of the suspension of the comfort spring 15 at the pawl wheel 14 occurs at the end of the tensioning process at the moment when the reeling shaft S is entrained by the comfort spring 15. This impact-like loading is compensated or reduced because the spring end 19 of the comfort spring 15 can act via the contact area 23 on the dampening element 22 and the elastic deformation of the element 22 resulting therefrom allows the single loop to move toward the stay whereby the free end 20 of the spring end 19 of the comfort spring 15 is displaced within the channel 21. After this displacement travel has been used, the force of the winding spring 16 is transmitted by the pawl wheel 14 and the comfort spring 15 onto the reeling shaft.

The present invention is, of course, in no way restricted to the specific disclosure of the specification and drawings, but also encompasses any modifications within the scope of the appended claims.

What we claim is:

1. A safety belt reeling device with comfort function, said safety belt reeling device comprising:

a housing;

a reeling shaft rotatably supported in said housing;

a pawl wheel rotatably mounted on said reeling shaft and switchable between a locked position in which rotation of said pawl wheel is blocked and a release position in which said pawl wheel is rotatable;

a winding spring, connected with a first end to said housing and with a second end to said pawl wheel, for rotating said reeling shaft when said pawl wheel is in said release position;

a comfort spring having a weaker spring force than said winding spring;

said comfort spring connected with a first end to said pawl wheel and with a second end to said reeling shaft and serially switched with said winding spring such that, after tensioning of said comfort spring, a force of said winding spring is transmitted via said pawl wheel and said comfort spring onto said reeling shaft;

said pawl wheel having a stay with a first and a second end;

said first end of said comfort spring guided in a single loop about said first end of said stay;

an elastically deformable dampening element positioned between said first end of said stay and said single loop;

said dampening element reducing a load impact on said comfort spring, when said pawl wheel is switched into said release position, by allowing a displacement of said single loop relative to said stay.

2. A safety belt reeling device according to claim 1, wherein said single loop has a free end extending from a point of directional reversal of said single loop toward an outer spring winding of said comfort spring.

3. A safety belt reeling device according to claim 2, wherein said dampening element has a zone of material weakening positioned between said point of directional reversal of said single loop and said stay.

4. A safety belt reeling device according to claim 3, wherein said stay has a channel and wherein said free end of said single loop is guided in said channel.

5. A safety belt reeling device according to claim 1, wherein said dampening element is slipped onto said stay.

* * * * *

UNITED STATES PATENT AND TRADEMARK OFFICE
CERTIFICATE OF CORRECTION

PATENT NO. : 5,823,457
DATED : 20 October 1998
INVENTOR(S) : Walter Jahn, Lars Axelsson, Frank Fugel It is certified that error appears in the above-indentified patent and that said Letters Patent is hereby corrected as shown below:

Title page, item

[30] Foreign Application Priority Data, insert --

March 25, 1996 [DE] Germany..........196 11 748.8--

Signed and Sealed this

Fifth Day of December, 2000

Attest:

Q. TODD DICKINSON

Attesting Officer     Director of Patents and Trademarks